Feb. 23, 1971 F. ZWART 3,565,469
LOCK FOR CONNECTING STRUCTURAL ELEMENTS
Filed Dec. 3, 1968 3 Sheets-Sheet 2
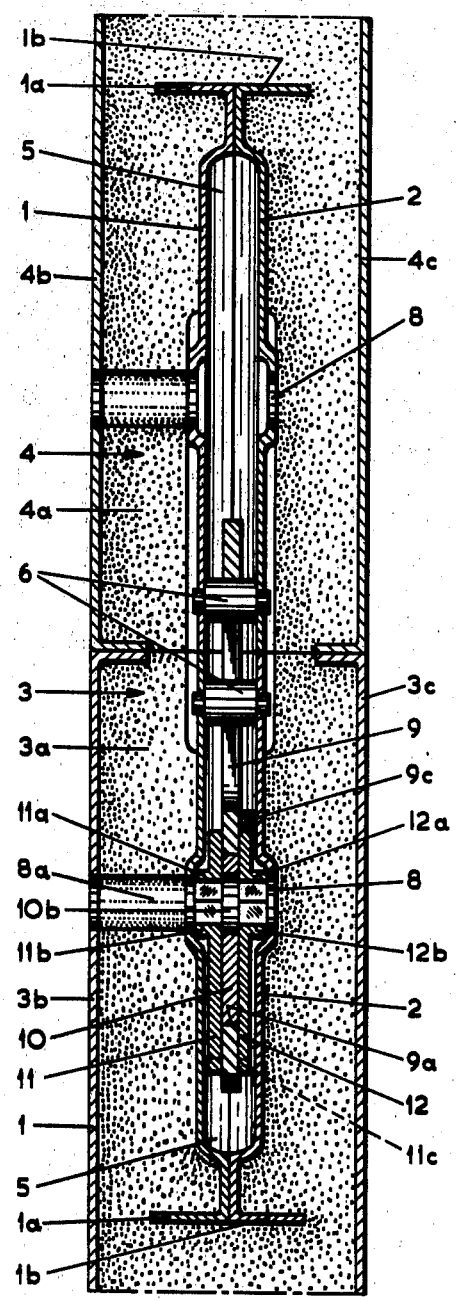
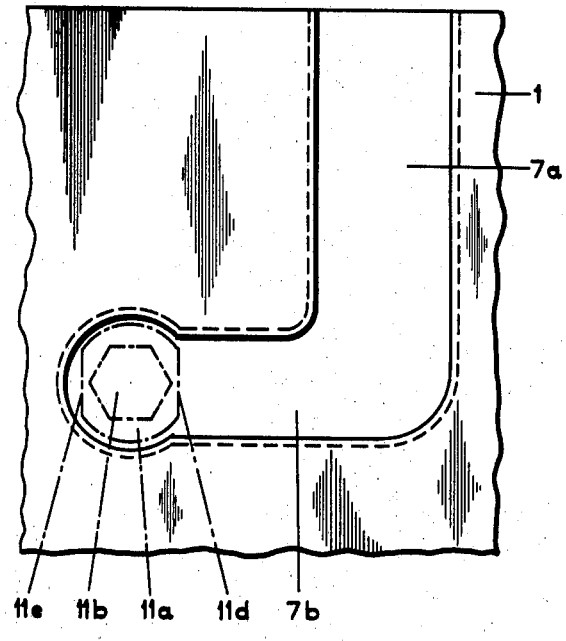
INVENTOR
Frederik Zwart
BY
Brumbaugh, Graves, Donohue & Raymond
ATTORNEY

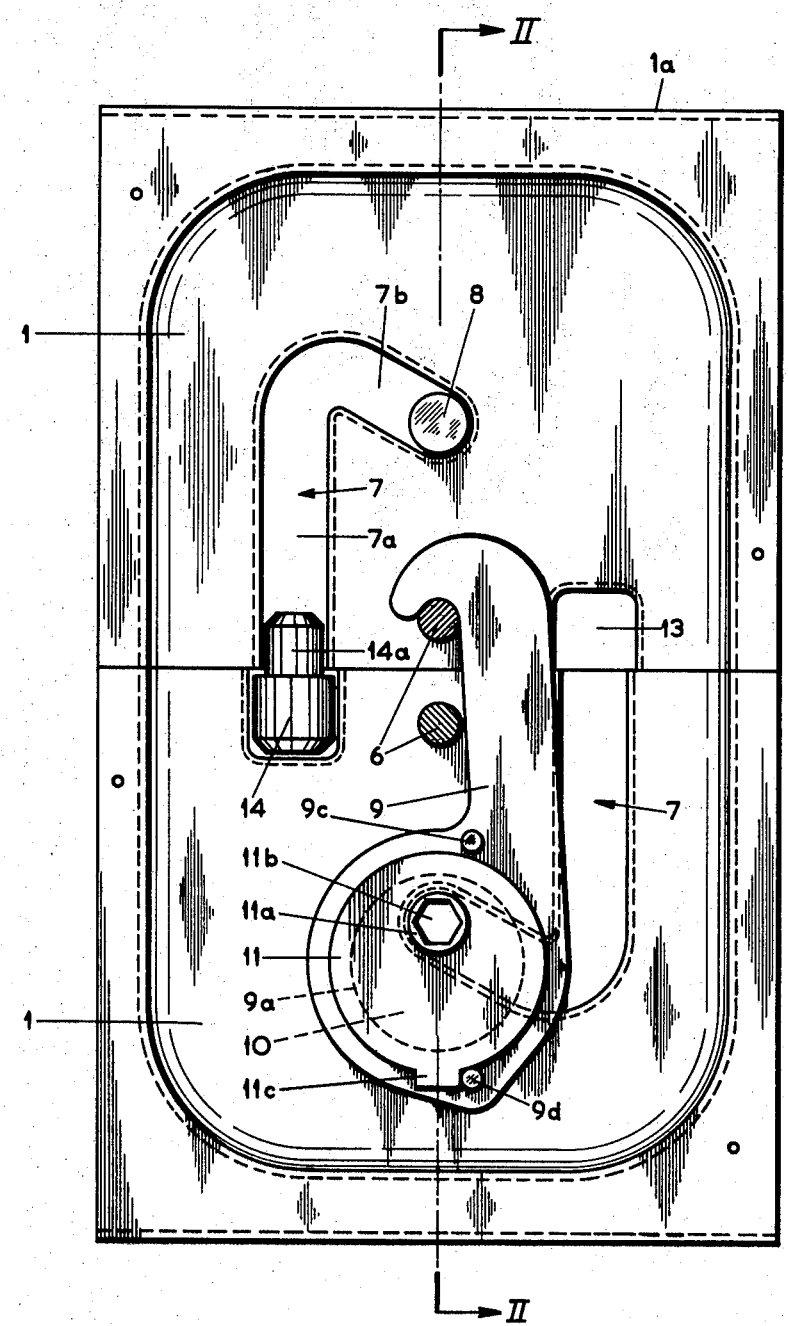

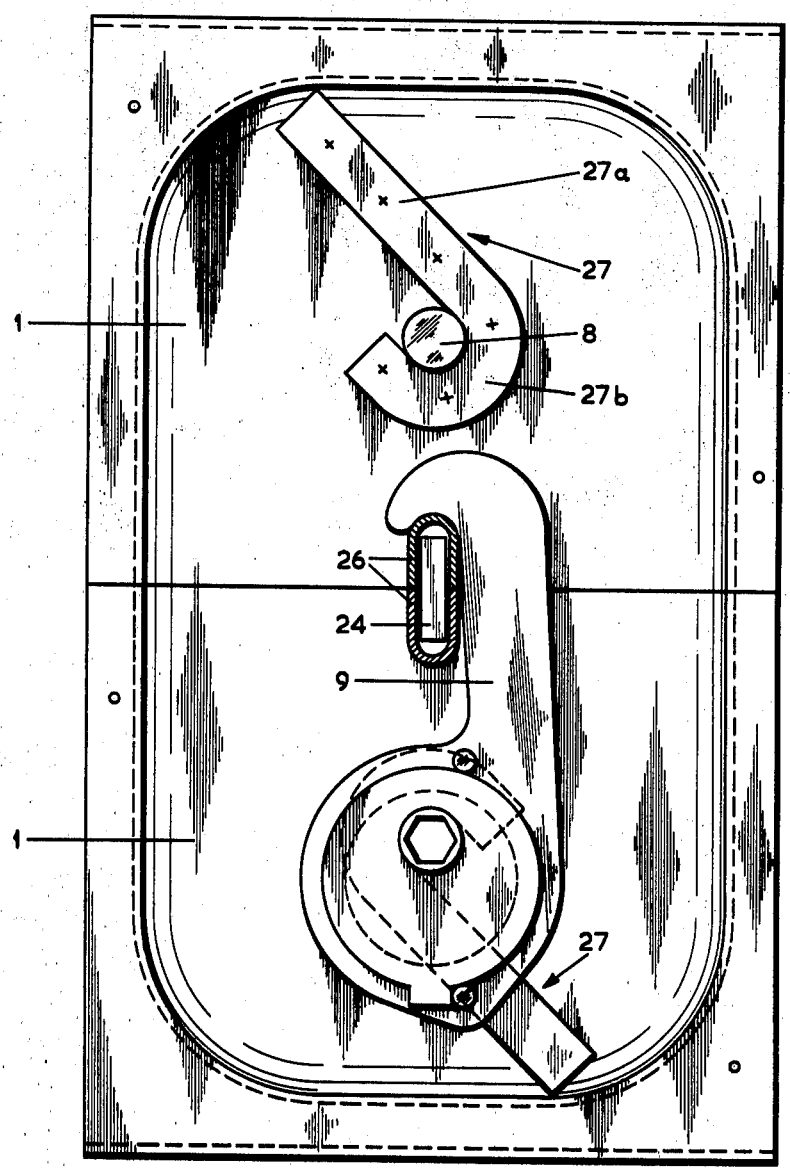

United States Patent Office 3,565,469
Patented Feb. 23, 1971

3,565,469
LOCK FOR CONNECTING STRUCTURAL ELEMENTS
Frederik Zwart, The Hague, Netherlands, assignor to A. De Hoop N.V., Rotterdam, Netherlands, a limited-liability company of the Netherlands
Filed Dec. 3, 1968, Ser. No. 780,842
Claims priority, application Netherlands, Dec. 6, 1967, 6716601
Int. Cl. E04c *1/30;* F16b *5/00*
U.S. Cl. 287—20.924                                   11 Claims

ABSTRACT OF THE DISCLOSURE

A lock for joining structural panels is disclosed, comprising identical open-ended housings respectively carried in the facing edges of the panels to be joined, each housing having a transverse member adapted to be engaged by an eccentrically operated latch hook removably mounted in the other housing. An opening in each housing allows entry of a key for moving the latch hook relatively to the transverse member of the other housing, thus permitting selective engagement and disengagement of the latch hook and the cooperating transverse member. Guide means are located in each lock housing to facilitate mounting of the latch hook within the housing.

BACKGROUND OF THE INVENTION

This invention relates to the assembly of construction panels or the like, and particularly to an improved lock mechanism which facilitates the joining together of the panels.

It is known in the construction of buildings or the like, to assemble the structure by linking up individual prefabricated panels, as, for example, where a freezing or cold room is formed by connecting together heat-insulated panels. Such a room may be constructed from a number of rectangular panels, which, at the side, top and lower edges, are connected with adjoining panels, uprights, or with sections of roof or floor elements.

Typically, the panels are joined together at the edges at one or more places by a lock mechanism, which may consist of two open-ended housings disposed in cooperative relation in the edges of the panels. The housings usually are fixed in position in the panels when the panels are fabricated. One housing is provided with a transverse member and the matching housing is provided with a projecting latch hook which cooperates with the transverse member of the other housing to lock the panels together when the two housings are brought into abutment with their open ends facing each other. In the prior art panel locks, the latch hook normally is fixed within one of the housings and cannot be removed. The prior art locks, therefore, comprise two different halves, a male half and a female half.

Although such locks have a practical usefulness, they have the disadvantage that a large number of different kinds of panels, provided with different halves of locks, must be kept in stock because, when assembling the panels, care has to be taken that a male half of a lock always faces a female half, and vice versa. This cannot always be realized in building, however, and causes considerable waste of time and material.

SUMMARY OF THE INVENTION

The foregoing and other disadvantages of presently known panel lock mechanisms are overcome, in accordance with the invention, by a lock mechanism having two halves of identical design, and in which the latch hook is a separate component which can be installed in either of the halves for cooperation with the transverse member of the opposite half of the lock.

In this way, each panel can be provided with a number of identical lock halves on all sides, and it need only be decided during the assembly of the panels whether a certain half should function as the male or female half of a lock. Thus it suffices to stock a number of standard panels and a number of separate latch hooks.

In order that the latch hook can be easily and correctly inserted into a lock half, the opposite walls of each housing are provided with guides for receiving portions of the latch hook. Preferably the guides start at a position eccentrically situated to the longitudinal center line of the lock housing and end at a position on the longitudinal center line of the housing, there forming a bearing for rotation of an eccentric which moves the latch hook into and out of engagement with the transverse member of the other lock half. Rotation of the eccentric is accomplished by means of a key that is inserted through an opening in the housing wall and into a corresponding keyway in the eccentric. An alignment member is disposed in a recess defined by the beginning portions of the respective guides and an enlarged portion of the cooperating housing to hold the lock halves in relative alignment.

In one embodiment the guides are formed by two identical flat strips, consisting of a straight part and an arc-shaped part, the strips being secured opposite each other on the inner sides of the walls of the lock housing. The transverse member in each of the lock halves may be formed by a U-shaped member which is perpendicular to the walls of the housing, and the open end of which coincides with the open end of the housing. With this configuration, the transverse member also defines a recess for receiving the alignment member for aligning of the two halves of the lock.

Both lock housings and the latch hook preferably are manufactured from sheet metal, and when so made the latch hook desirable includes a circular, freely rotatable disk with an eccentrically situated opening for the reception of the operating key, the disk being slightly thicker than the latch hook and having a slightly smaller diameter than the circular opening in the latch hook body in which it is disposed. A pair of plates are connected to the disk on both sides thereof, each plate being provided with projecting cylindrical portions about which the plates and the disk rotate. The plates are further provided with an opening for the reception of the key, these last openings being in alignment with the opening in the disk. This arrangement of the latch hook, circular plate and aligned openings comprises an eccentric for moving the latch hook relative to the cooperating transverse member and has a very simple form which can be easily constructed.

THE DRAWINGS

For a better understanding of the invention, reference may be made to the following description of an exemplary embodiment, taken in conjunction with the figures of the acompanying drawings, in which:

FIG. 1 is a side view of a lock according to a first embodiment of the invention, with one wall of the lock housings removed for clarity;

FIG. 2 is a sectional view taken along the line II—II of FIG. 1, looking in the direction of the arrows, and in which sections of panels are shown;

FIG. 3 is a side view of a second embodiment of the lock, with one wall of the housings removed for clarity; and FIG. 4 is an enlarged detail view showing a modification of the latch hook guide and pivot pin structure.

DESCRIPTION OF AN EXEMPLARY EMBODIMENT

Referring to FIGS. 1 and 2, a representative lock according to the present invention includes two identical halves, each being enclosed by a lock housing preferably consisting of two pieces 1 and 2 of sheet metal, which are joined together along the edges. Both pieces 1 and 2 of sheet metal are symmetrical in form, and the edges of the sheets situated opposite the open end of the housing preferably are bent outward to form flanges 1a and 1b, giving better resistance to the pulling away of the housing from the panel. In FIG. 2 the housings are shown in place in sections of two panels 3 and 4 that are to be linked together. For illustrative purposes, the panels are shown as comprising synthetic foam cores, 3a and 4a, which are covered, both at the front and the back, by thin plates, 3b, 3c and 4b, 4c, respectively.

Over the majority of their extent, the sheets 1 and 2 are deformed so as to define between them, when joined, a hollow space 5, in which there is a transverse pin 6 on the longitudinal center line of the housing (see FIG. 1). Portions of the walls 1 and 2 have been further widened locally to form longitudinal and transverse grooves which, since they are provided opposite each other in the walls 1 and 2, form a guide 7.

Referring to FIG. 1, the guide 7 consists of a straight part 7a, running parallel to the longitudinal axis of the housing, and of a straight part 7b, lying at a sharp angle to the part 7a, and ending at a location on the longitudinal axis of the half of the lock. The part 7a is situated eccentrically as regards the longitudinal axis of the half of the lock. At the end of the part 7b of the guide, the walls 1 and 2 are each provided with an opening 8, through which a hexagonal key (not shown) can be inserted for a purpose later described. An opening 8a is provided in the panels 3 and 4 on at least one side of the lock to permit the key to be passed through the openings 8 in the walls.

The latch hook 9, which is separate from the lock housings, preferably consists of a flat piece of sheet metal having a latch finger at one end and a generally circular body member at the other end, the body member having a circular opening 9a. A circular disk 10, of slightly smaller diameter than the opening 9a, and of slightly greater thickness than the hook 9, is rotatably disposed in the opening 9a. Generally circular plates 11 and 12 are secured, as by spot welding, to the outer sides of the circular disk 10, and are provided at an eccentric position with outwardly bent portions 11a and 12a, respectively, the outer circumferences of which function as pivot pins for the disk 10 and the plates 11 and 12. The portions 11a and 12a preferably are formed with a punching tool which simultaneously provides the innersides of the pivoting pins with hexagonal openings 11b and 12b respectively. The hexagonal openings 11b and 12b are aligned with a hexagonal opening 10b in the disk 10.

Two stop pins 9c and 9d are located on one side of the latch hook 9 in line with the path of travel of a tongue 11c carried by the plate 11. The tongue 11c strikes the pins 9c and 9d when the two ultimate axial positions of the latch hook have been reached. In this way, a positive indication of latching and unlatching is given.

In addition, each lock housing is provided with an enlarged portion 13 for receiving an aligning pin 14. The portion 13 is formed by locally deforming the walls 1 and 2, and is preferably so disposed that its longitudinal axis is situated at the same distance from the longitudinal axis of the housing as is the corresponding axis of the guide part 7a. Thus, a projecting part 14a of the aligning pin 14 can be mated with the beginning of the guide 7 of the opposite housing of the lock.

When it is desired to link up two panels, such as the panels 3 and 4, the separate latch hook 9 is first inserted into one of the lock housings by guiding the pivoting pins 11a and 11b of the eccentric along the guide 7 to the final location at the far end of the guide. An aligning pin 14 is then placed in the appropriate enlarged portion 13. The panels are then brought together so that open ends of the two lock housings are oppositely disposed, whereby the projecting latch hook 9 can be received into the opposite housing. A key is then inserted through the openings 8a, 11a and 10b for example, and the disk 10 is rotated to cause the latch finger to be withdrawn axially and engage the pin 6, thus drawing the panels 3 and 4 tightly together. This will be clearly indicated by the abutment of the tongue 11c against the stop pin 9d. Of course, the plate 11, and thereby the disk 10, should be turned so that the tongue 11c is in engagement with the stop pin 9c before the latch hook 9 is inserted in the housing.

Although the guide 7 is shown in FIG. 1 as consisting of two straight parts 7a and 7b, the whole guide can be curvilinear in shape if desired. It is in any case preferable, however, to have the latter part of the guide running obliquely, so that an unmistakable position for the pivoting pins is obtained.

A second embodiment of the panel lock of the present invention is shown in FIG. 3, and in regard to the structure of the lock housings and of the separate latch hook 9 is identical to the embodiment of FIGS. 1 and 2. The lock according to said second embodiment is much simpler to construct, however, than the lock according to the first embodiment because of a simplified design and the combining of separate elements and functions into a single element.

Instead of shaping the walls 1 and 2 to form the guides 7, the guide is formed in the FIG. 3 embodiment by two strips of metal 27 which are secured in opposed relation to the inner sides of the walls 1 and 2. Spot welding or any other suitable means can be used to secure the strips 27 to the walls. Each strip 27 preferably consists of a straight part 27a and a semicircular part 27b, the center of which coincides with the center of the openings 8 in the walls 1 and 2, and desirably is positioned within the housing so that the part 27a is disposed diagonally to the longitudinal axis of the housing.

A second modification and simplification consists of the combining of the transverse pin 6 and the enlarged portion 13 for receiving the aligning pin 14 (see FIG. 1) into a U-shaped member 26 extending between, and attached to, the inner sides of the walls 1 and 2. The U-shaped members 26 of the cooperating lock halves are opposite each other on the longitudinal axis of the respective housings of the lock.

The aligning pin 24 may take the shape of a small generally rectangular piece of metal which slidingly fits in the space defined by the facing U-shaped members 26. When the pin 24 is placed inside the U-shaped member 26 of the lower half of the lock, the projecting part of the pin 24 will, when the upper half of the lock is placed on the lower half, be taken up in the U-shaped member 26 of the upper half of the lock, by which the lock halves are aligned in a simple way.

On occasion the latch hook 9, after it has been inserted into a housing but before it is engaged with the pin of the opposite half of the lock, may fall back into the guide. This most often occurs where the housings containing the latch hooks are in the upper edge of a panel. To avoid this, it suffices to secure the latch hooks by the insertion of a key through either of the openings 8 in the lock housing and into the opening 11b or 12b. After the hook 9 is engaged with the transverse pin of the opposite lock housing, the key may of course be withdrawn.

A modification of the lock housings designed to overcome the problem of latch hooks falling out of position once inserted is shown in FIG. 4 and, apart from the shape of the latch hook guide, is identical with the embodiment of FIGS. 1 and 2. The guide here consists of two straight parts 7a and 7b, which are generally perpendicular to each other and are of different widths, the part 7a being wider than the part 7b. In this instance, the pivoting pins 11a and 12a are each provided with two flat sides 11d and 11e, which may be formed simultaneously with the punching of the pivot pins, thus giving the pivot pins an elongated shape in cross section.

The part 7b of the guide has a width that is sufficient to allow the pivot pins to pass when the flat sides extend in a direction parallel to the sides of the part 7b and to prevent their passage when the flat sides are at right angles to the sides (see FIG. 4). Also, the part 7b is circularly widened at its far end to a diameter sufficiently large to receive the large dimension of the pivot pins. This allows the pins to be rotated to the position shown in FIG. 4 where the flat sides 11d and 11e are parallel to the longitudinal axis of the housing. It will be understood, of course, that the flat sides 11d and 11e are parallel to the longitudinal axis when the latch hook is in either its fully extended or fully retracted position.

When a panel is to be attached to a vertical or a horizontal post, as distinguished from another panel, the halves of the locks on the edges of the panels directed towards the posts are preferably all made the male half by inserting a latch hook in the housing, so that only a hollow space, roughly as long as but much less deep than the space 5 of a housing, need be provided in the posts to contain a transverse pin resembling the pin 6. These posts often are not large enough to accommodate a complete half of a lock and, by making the lock halves carried by the panels all male, assembly of the panels is greatly simplified.

It will be understood by those skilled in the art that the above-described embodiments are intended to be merely exemplary in that they are susceptible of modification and variation without departing from the spirit and scope of the invention. For example, although the lock of the present invention has been disclosed by reference to the construction of cold or freezing rooms, it may be used with equal facility and advantage wherever structural elements are to be joined together, such as in the construction of cupboards and the erection of partitions in buildings. All such variations and modifications, therefore, are included within the scope of the invention as set forth in the appended claims.

I claim:

1. A lock for connecting structural elements, comprising identical cooperating halves, each enclosed by a housing having an open end, adapted to be mounted in an element to be connected with the open end of the housing opening into a surface of the element, a member disposed in at least one of the housings transversely of the open end, a separate latch hook removably mounted in the other housing and projecting through the open end thereof, the latch hook being adapted to engage te transverse member of the one housing when the lock halves are brought together in end-to-end relation, an eccentric disposed in an opening in the latch hook and rotatably carried by the other housing for selectively moving the latch hook into and out of locking engagement with the transverse member of the one housing, the eccentric having laterally projecting pivot pins and openings therein for the insertion of a key, and a guide for receiving the pivot pins of the eccentric disposed on the opposed inner walls of each housing, said guide beginning at the open end of the housing at a position off the longitudinal axis of the housing and ending at a position substantially on the longitudinal axis of the housing, the latter position forming a bearing for the pivot pins and at which location the opposed walls of the housing are provided with an opening for the passage of the key into the openings in the pivot pins.

2. A lock according to claim 1, in which the guide is formed by two identical flat strips, each having a straight part and an arc-shaped part, the strips being secured opposite each other on the inner sides of the walls of the housing.

3. A lock according to claim 2, in which the straight part of the strips extends diagonally, relative to the longitudinal axis of the housing, toward the open end of the housing.

4. A lock according to claim 1, in which the guide is formed by U-shaped grooves in the opposed walls of the lock housing.

5. A lock according to claim 4, in which the guide consists of two straight parts disposed at an acute angle to each other, the beginning part of which is parallel to the longitudinal axis of the housing.

6. A lock according to claim 1, in which the transverse element of each lock half is disposed substantially on the longitudinal axis of the housing.

7. A lock according to claim 6, in which the transverse element of each lock half comprises a U-shaped member disposed generally perpendicular to the walls of the housing, the open side of which faces the open end of the housing.

8. A lock according to claim 7 in which the U-shaped member further defines a recess for receiving a housing alignment member, the alignment member being of such a size that it substantially fills the space defined by the U-shaped transverse members of the respective lock halves when the lock housings are brought together in end-to-end relation.

9. A lock according to claim 1 in which each housing includes an enlarged portion located equidistantly from, but on the opposite side of, the longitudinal axis of the housing as the beginning of the guide for the pivot pins, the enlarged portion defining with the beginning of the pivot pin guide of the cooperating lock housing a recess for receiving a housing alignment member when the cooperating lock halves are brought together in end-to-end relation.

10. A lock according to claim 1 in which the latch hook is a generally planar member and the opening therein is generally circular, and in which the eccentric comprises a generally circular disk coaxially disposed in the opening in the latch hook and having an opening for the reception of a key located eccentrically of its axis, the disk being slightly thicker than the latch hook and of a slightly smaller diameter than the opening in the latch hook, and a pair of plates secured to the circular disk on both sides thereof, for rotation therewith, each of the pair of plates being provided with a laterally extending generally cylindrical portion forming one of the pivot pins of the eccentric, each cylindrical portion having an opening coaxial with the eccentrically located opening in the cirular disk for the passage of the key.

11. A lock according to claim 1 in which each pivot pin has at least two flat sides opposite each other, and in which the guide of each housing has two generally perpendicular straight parts, the part of the guide adjacent the end thereof forming the bearing for the pivot pins having a width slightly greater than the distance between the flat sides but smaller than the diameter of the pivot pins, the said pivot pin bearing end of the guide having a diameter slightly greater than the diameter of the pivot pins.

References Cited

UNITED STATES PATENTS

| | | | |
|---|---|---|---|
| 2,340,864 | 2/1944 | Carpenter | 287—20.92 |
| 3,191,244 | 6/1965 | Burke | 287—20.924 |
| 3,280,522 | 10/1966 | Palfey | 52—583X |
| 3,341,233 | 9/1967 | Cushman | 287—20.924 |
| 3,353,314 | 11/1967 | Melcher | 52—583X |
| 3,365,851 | 1/1968 | Cushman | 52—583X |

MARVIN A. CHAMPION, Primary Examiner

E. J. McCARTHY, Assistant Examiner

U.S. Cl. X.R.

52—584